United States Patent Office 2,772,001
Patented Nov. 27, 1956

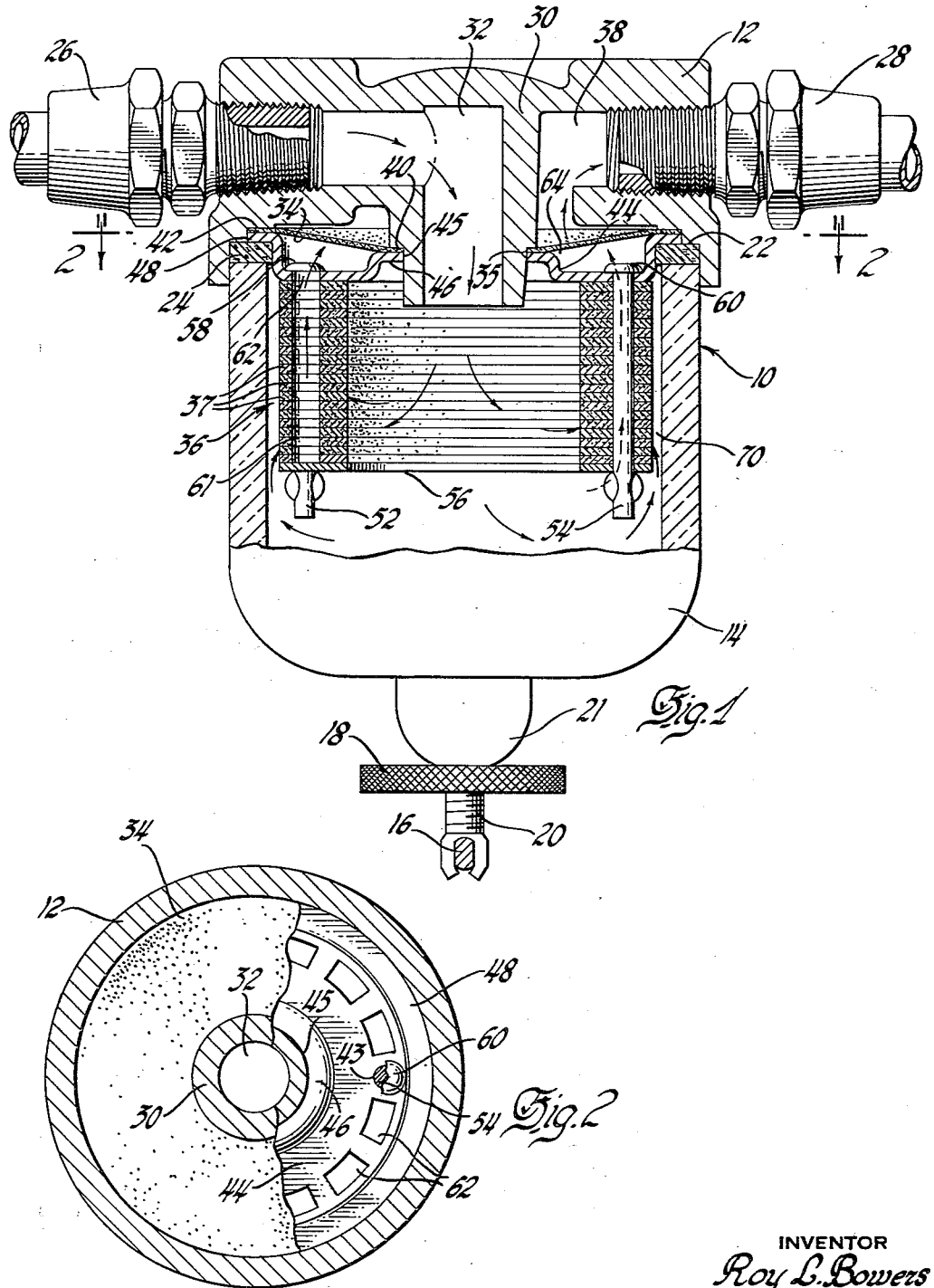

2,772,001

FILTER FOR FLUIDS SUCH AS GASOLINE

Roy L. Bowers, Flint, Mich., assignor to General Motors Corporation, Detroit, Mich., a corporation of Delaware Application November 16, 1953, Serial No. 392,337

1 Claim. (Cl. 210—165)

This invention relates to improved filters for liquids and particularly to filters for removing impurities from gasoline.

The object of the present invention is to provide an improved filter of compact construction employing a primary filter element of long life and in which provision is made for entrapping any impurities which may pass through the primary filtering element.

A feature of the invention is the provision of two filter elements, one of which is adapted to perform a secondary function in that it provides a seal to prevent contamination of the filtered liquid by unfiltered liquid.

Another feature comprises two filter elements compactly arranged in series in a single filtering device to traverse the flow path of the liquid to be treated.

These and other important features of the invention are hereinafter described in detail in the specification and pointed out more particularly in the appended claim.

In the drawings:

Fig. 1 is an elevation view, partly in section, of a filter embodying the principles of the present invention; and Fig. 2 is a sectional view taken along line 2—2 of Fig. 1 with portions removed better to illustrate the construction.

The filter, as shown in the drawing, comprises a receptacle generally indicated at 10 which includes a top portion 12 of cast metal and a bowl portion 14 of glass. The bowl 14 is held in position with respect to the top portion 12 by means of a bail 16 of conventional construction, the latter employing a knurled disc 18 which is threaded on a pin 20 to bring a metal cup 21 into abutting relation with the bottom of the bowl portion 14.

An annular shoulder 22 is provided within a recess on the underside of the top portion 12 and interposed between that shoulder and the top rim of the bowl 14 is a gasket 24 forming an exterior seal. As is conventional, the bowl may be pressed against the gasket 24 by suitable adjustment of the knurled disc 18, the ends of the bail 16 being pivoted in the conventional manner to the sides of the top portion 12.

The top portion is provided with oppositely disposed inlet and outlet connections 26 and 28 respectively. The inlet connection 26 communicates with an inlet conduit 30 which is integral with or is a wall portion of the top portion 12 and aids in defining a right angle passage 32 one end of which terminates within and is concentric to two filter elements 34 and 36.

The conduit 30 is partically surrounded by a passage 38 which leads from the interior of the bowl 14 to the outlet connection 28.

The conduit is provided with an annular exterior shoulder 40 which is downwardly directed and just within the shoulder 22 on the top portion 12 is provided another annular downwardly directed shoulder 42.

An annular perforated support plate 44 is arranged concentrically with the conduit 30 and is provided with raised inner and outer marginal portions 46 and 48 and an aperture 45. The proportions of the plate 44 are such that when the outer margin 48 thereof is interposed between the annular shoulder 42 and the gasket 24, it is adapted to apply pressure to the margin of the filter element 34 in such a manner as to cause the latter to function as a gasket. The raised inner portion 46 of the plate 44 simultaneously compresses the inside margin of the fiter element 34 against the annular shoulder 40 forming a tight seal therewith. The filter element 34 is made in the form of a flat disc with a central orifice 35 and is made of resin-impregnated paper or fibrous material which is yieldable and thereby suitable to form a seal. When installed in the filter assembly the disc 34 is dished or distorted as seen in Fig. 1.

The filter element 36 functions as a primary filter and is in the form of a stack of porous and fibrous sheet material discs 37 clamped together by means of two pins or rivets 52 and 54 between a bottom metal ring 56 and the support plate 44. The pins 52 and 54 are diametrically opposed and are provided with heads 58 and 60 and pass down through holes 43 in the plate 44, the filter discs 37 and the metal backing plate 56. Each of the discs 37 of filter material is provided with a series of arcuate slots 61 some of which are shown in section and on the left side of the element 36 as viewed in Fig. 1. The slots of adjacent discs 37 are arranged in alignment to provide a series of vertical passages each of which, being blocked at the bottom of the filter element by means of the backing plate 56, communicates at its upper end through an arcuate perforation 62 of the plate 44 with an annular space 64 beneath the filter element 34.

It will be noted that the filter element 36 is tubular in form and that a clearance 70 exists between the exterior wall thereof and the interior wall of the bowl 14.

Further details regarding the construction of the filter element 36 are disclosed in the application for United States Letters Patent S. N. 224,346, filed May 3, 1951, in the names of Roy L. Bowers and John R. Gretzinger. It will be appreciated, however, that the details of construction of the primary filter element 36 may be varied considerably without departing from the principles of the present invention.

During a filtering operation, gasoline or other fluid having impurities therein is caused to enter through the connection 26 and to flow down through the inlet passage 32 into the bowl 14 to contact both the exterior and the interior surfaces of the primary filter element 36. The fluid then is clarified as it penetrates the filter element 36 and enters the multiple vertical passages formed by the spaced sets of aligned arcuate slots 61 and rises to emerge from the slots 62 into the chamber 64. The clarified gasoline then passes through the filter element 34 and any fine particles or impurities which may pass through the main filter element 36 are effectively removed from the fluid by the filter element 34. The clean fluid then passess upwardly through the passage 38 and is discharged through the connection 28.

I claim:

In a filter, the combination of a receptacle comprising a top portion and a bowl portion held together under pressure to form an exterior seal between them, inlet and outlet passages in said top portion and communicating with said bowl portion, said inlet conduit leading centrally and downwardly into said bowl portion, two filter elements surrounding said inlet conduit and mounted within said receptacle to operate in series in a flow path leading from said inlet conduit into said bowl portion and to said outlet passage, one of said elements comprising a stack of flat annular filtering rings coaxially mounted on a support plate having perforations, the said stack having an annular series of vertical passages blocked at their lower ends and communicating at their upper ends with said perforations the other of said elements being in the form of a disc of yieldable filter material having a central aperture, the margins of said support plate and said disc within said exterior seal being clamped by said pressure into sealing relation with said top portion to determine said flow path, and the arrangement being such that fluid impurities emanating from said inlet conduit are brought into contact with the interior and exterior surfaces of said one of said elements for retention in said bowl portion.

References Cited in the file of this patent

UNITED STATES PATENTS

| | | |
|---|---|---|
| 1,455,911 | Giffin | May 22, 1923 |
| 1,705,042 | Babitch | Mar. 12, 1929 |
| 1,730,360 | Fisher | Oct. 8, 1929 |
| 2,159,196 | Babitch | May 23, 1939 |
| 2,365,525 | Cox | Dec. 19, 1944 |
| 2,521,060 | Hallinan | Sept. 5, 1950 |
| 2,617,535 | Hamilton | Nov. 11, 1952 |

FOREIGN PATENTS

| | | |
|---|---|---|
| 298,070 | Italy | June 27, 1932 |